Patented Oct. 26, 1954

2,692,899

UNITED STATES PATENT OFFICE 2,692,899

PENTACHLOROPHENOL

Alfred J. Kolka, Birmingham, and William E. Burt and Henry W. Hoftiezer, Royal Oak, Mich., assignors to Ethyl Corporation, New York, N. Y., a corporation of Delaware No Drawing. Application December 27, 1951, Serial No. 263,714

2 Claims. (Cl. 260—623)

This invention relates to pentachlorophenol, and particularly to its production by alkaline hydrolysis of hexachlorobenzene.

Pentachlorophenol is a particularly valuable compound for use in the insecticidal, fungicidal, pesticidal and bactericidal field. It is especially in demand to combat insects such as the beetle or louse and fungi like those which cause leather mold, and to aid in preserving wood, textiles and similar materials. It is generally prepared by one of two methods: chlorination of phenol or chlorophenols; or, preferably, hydrolysis of hexachlorobenzene. The latter method is effected by dissolving the chlorinated benzene in methyl alcohol and treating with sodium hydroxide. Methanol is the only simple alcohol suitable as a medium. Even the alcohol next in the aliphatic series, ethyl alcohol, reacts with the hexachlorobenzene to produce ethers of pentachlorophenol. Isopropanol has the same undesirable effect, and product yields with any material except methanol are poor, generally a great deal below 50%.

It is among the objects of this invention to devise a process for making pentachlorophenol which is at the same time simple to operate and allows extremely high yields. A particular object is to hydrolyze hexachlorobenzene under certain specific operating conditions whereby an improved quality pentachlorophenol is obtained. Other objects will be apparent from a study of the ensuing description.

These and other objects are realized by the present invention which broadly comprises heating together hexachlorobenzene, an alkali metal hydroxide and an alkanediol. More specifically, our invention comprises heating to an elevated temperature preferably not less than 150° C. a mixture of hexachlorobenzene, an alkali metal hydroxide and an alkanediol. Under these conditions hydrolysis of the benzene compound rapidly occurs and very high yields of pentachlorophenol, e. g. in the order of over 90% of theory, are obtained. This product may be precipitated from the alkanediol system by treatment with hydrochloric acid or gaseous HCl, or by similar known means which will readily occur to one skilled in the art. The solvent may then be separated, as by filtration, and recycled for reuse, if desired. The resulting pentachlorophenol can be purified by conventional methods, such as recrystallization from benzene, or it may be used directly as a component of insecticides, fungicides and the like.

According to a more specific and frequently preferred embodiment of this novel process, a mixture of hexachlorobenzene and an alkali metal hydroxide, e. g. sodium hydroxide, is heated in an alkanediol solvent system at the refluxing temperature of the mixture and at atmospheric pressure. Alkanediols containing substantially between two and six carbon atoms are generally preferred for use, and an especially good choice is ethylene glycol.

Certain of these alkanediols are also known familiarly as glycols, but the "alkane" terminology used herein is deemed better form. Thus, ethylene glycol is really 1,2-ethanediol. This compound is particularly satisfactory in the present process because of availability and relative cost. Other alkanediols, however, are equally operable; particularly, as above mentioned, those containing up to about six carbon atoms. Examples of such materials are 1,2- and 1,3-propanediols; 1,2-, 2,3-, 1,4- and 1,3-butanediols; 1,2-, 1,4-, 1,5-, 2,3-, and 2,4-pentanediols; and 1,6- and 2,3-hexanediols. The proportion of solvent employed in a particular reaction is relatively unimportant, so long as sufficient material is present to dissolve the required amount of hexachlorobenzene. Generally speaking, two to three moles of alkali metal hydroxide are employed per mole of hexachlorobenzene, and the solvent is present in a quantity sufficient to provide a 5 to 25% by weight solution of the hydroxide.

Various alkali metal hydroxides are useful as hydrolyzing agents. The sodium compound is generally chosen as most readily obtainable and inexpensive, but potassium hydroxide or lithium hydroxide can also be utilized. As previously noted, a preferred proportion of this reagent is from two to three moles per mole of hexachlorobenzene. However, equimolar ratios may be employed, if desired, or an excess of the base even greater than three moles may be present, or less than one mole of base may be used (although reaction will naturally be then quite incomplete).

As is pointed out above, an especially preferred embodiment of the invention comprises heating a mixture of hexachlorobenzene and an alkali metal hydroxide, preferably sodium hydroxide, in a solvent comprising an alkanediol at the reflux temperature of the mixture and at atmospheric pressure. The advantage of operating without complex and expensive high-pressure equipment is obvious and the present choice of special solvents, reagents and temperatures whereby this is made possible represents a distinctly important advance in the art.

The following example is not intended as a limitation to this invention but only as an illustration thereof. Indeed, as many apparently widely different embodiments of the invention may be made without departing from the spirit and scope hereof, it is to be understood that this invention is not limited, except as defined in the appended claims.

Example I

A mixture of hexachlorobenzene and sodium hydroxide in the molar ratio of 1:2.5 was placed in sufficient 1,2-ethanediol to provide a 15% by weight content of the alkali in the solvent. The system was then heated at a atmospheric pressure under refluxing conditions (temperature about 198° C.). At the end of 1½ hours under these conditions the pentachlorophenol product was recovered from the system by precipitation with concentrated hydrochloric acid and simple filtration of the precipitate. After washing with water and drying, the purity, as determined by chloride analysis and by neutralization with standard sodium hydroxide solution was at least 98%. The yield was 96% of theory.

When this procedure is repeated, except that 1,2-propanediol is substituted for 1,2-ethanediol and the reaction is carried out at the reflux temperature of the system (around 190° C.) equally advantageous results are obtained. Similar results are obtained with 2,3-hexanediol, 1,5-pentanediol, 2-methylpropandiol-1,2, 1,2-butanediol, 1,4-butanediol and the like.

Example II

When the procedure of Example I is again repeated, this time substituting potassium hydroxide for the sodium hydroxide, substantially identical results are obtained.

What is claimed is:

1. A method for the preparation of pentachlorophenol of high purity which comprises heating to a temperature above about 150° C. a mixture of hexachlorobenzene, an alkali metal hydroxide and an alkanediol containing from 2 to 6 carbon atoms, the mole ratio of the alkali metal hydroxide and hexachlorobenzene being between about 2:1 and 3:1, the alkanediol being present in a quantity sufficient to provide a 5–25 percent solution by weight of the hyroxide, and thereafter acidifying and recovering the pentachlorophenol product.

2. The method of claim 1, wherein the alkanediol is ethylene glycol and the alkali metal hydroxide is sodium hydroxide.

References Cited in the file of this patent

UNITED STATES PATENTS

| Number | Name | Date |
|---|---|---|
| 2,107,650 | Smith et al. | Feb. 8, 1938 |
| 2,509,245 | Nikawitz et al. | May 30, 1950 |
| 2,563,815 | Bruce | Aug. 14, 1951 |

OTHER REFERENCES

Weber et al., "Ber. der deut. Chem. Gesell," vol. 18, pages 335–7 (1885).